United States Patent [19]
Kim et al.

[11] Patent Number: 5,539,423
[45] Date of Patent: Jul. 23, 1996

[54] THREE DIMENSIONAL VIEWING SYSTEM FOR USE WITH A VIDEO CASSETTE RECORDER

[75] Inventors: Ul-Je Kim, Seoul; Heang-Young Kim, Incheon, both of Rep. of Korea

[73] Assignee: Daewoo Electronics Co., Ltd., Seoul, Rep. of Korea

[21] Appl. No.: 268,568

[22] Filed: Jul. 6, 1994

[30] Foreign Application Priority Data

Jul. 15, 1993 [KR] Rep. of Korea ............ 93-13365

[51] Int. Cl.$^6$ .................................................. G09G 5/00
[52] U.S. Cl. ........................................ 345/8; 348/56
[58] Field of Search ................. 345/7, 8; 348/51, 348/52, 57, 56; 358/335; 359/13, 464, 466, 26, 462, 463, 477; 351/158; H04N 13/04, 15/00

[56] References Cited

U.S. PATENT DOCUMENTS

| | | | |
|---|---|---|---|
| 4,021,846 | 5/1977 | Roese | 348/57 |
| 4,772,944 | 9/1988 | Yoshimura | 348/56 |
| 4,907,860 | 3/1990 | Noble | |
| 4,967,268 | 10/1990 | Lipton et al. | 348/56 |

Primary Examiner—Richard Hjerpe
Assistant Examiner—Chanh Nguyen
Attorney, Agent, or Firm—Finnegan, Henderson, Farabow, Garrett & Dunner

[57] ABSTRACT

A three dimensional viewing system for use with a VCR for the three-dimensional viewing of an image having right-eye and left-eye subimages in alternating sequence reproduced by the VCR wherein the VCR generates a switching pulse which is in synchronization with the alternating sequence. The three dimensional system comprises a pair of three-dimensional viewing glasses having a pair of lenses made of a liquid crystal material through which the right-eye subimage and the left-eye subimage are viewed by regulating the on/off states of the lenses; a pulse generator for generating a driving pulse adapted to activate the liquid crystal material; and a mixing circuit for multiplexing the switching pulse and the driving pulse to produce an on/off driving signal divided into a first and a second driving signals that are 180 degrees out of phase with each other wherein each of the first and the second driving signals is used to regulate the on/off states of the lenses.

2 Claims, 4 Drawing Sheets

THREE DIMENSIONAL VIEWING SYSTEM FOR USE WITH A VIDEO CASSETTE RECORDER

FIELD OF THE INVENTION

The present invention relates to a three dimensional viewing system for use with a video cassette recorder for the three dimensional viewing of a video image.

BACKGROUND OF THE INVENTION

There are many known methods for reproducing spectacles in three-dimensional images so that an observer can have a full spatial impression thereof. This is done, e.g., by arranging two different images of an object, e.g., a "right-eye" image and a "left-eye" image, photographed from two different directions or angles as a viewer would see the object with his two eyes along the corresponding directions; and allowing the viewer to see the right-eye image and the left-eye image displayed on a screen in an alternating sequence through a pair of glasses operating in the same alternating sequence. One of such three dimensional viewing systems is described in U.S. Pat. No. 4,907,860 issued to Lowel A. Noble, "Three Dimensional Viewing Glasses". The Noble patent comprises a pair of three dimensional viewing glasses which are alternatingly turned on and off, and have lenses made of a liquid crystal material and a remote synchronization signalling system which transmits a control signal to change the on and off states in each of the lenses. The control signal is generated in synchronization with the alternating occurrences of the right-eye and left-eye images: that is, when such control signal is transmitted to the glasses, the right-eye and the left-eye images can be perceived by the observer's right and left eyes, respectively.

Similarly, for three dimensional viewing with a video cassette recorder("VCR"), a video source such as a video tape is employed to provide a sequence of video frames, each of which may be divided into two video fields corresponding to two different images that are recorded from a first and a second directions, respectively, in an alternating sequence. When the sequence of video frames is reproduced by the VCR, one of the two fields can be viewed as a right-eye image and the other as a left-eye image through the use of the three dimensional viewing glasses and the synchronization signalling system as described above.

It is, however, difficult to synchronize between the occurrences of the right-eye and left-eye images and the alternating on/off states of the lenses at an initial stage since the control signal is artificially produced by the remote synchronization signalling system. Therefore, if there is a poor synchronization, there will be a defective reproduction of a three dimensional imagery. Further, there is no way to change the alternating sequence between the right-eye and left-eye images when the right-eye image is displayed for viewing by the left eye and vice versa.

SUMMARY OF THE INVENTION

It is, therefore, an object of the invention to provide a three dimensional viewing system for use with a VCR capable of providing a three dimensional viewing of a video image reproduced by the VCR.

It is another object of the invention to provide an improved three dimensional viewing system for use with a VCR capable of changing the alternating sequence between a right-eye and a left-eye images when they are presented for viewing in a reverse order with respect to the viewer's eyes.

In accordance with the invention, there is provided a three dimensional viewing system for use with a VCR for the three-dimensional viewing of an image having right-eye and left-eye subimages in alternating sequence reproduced by the VCR wherein the VCR generates a switching pulse which is in synchronization with the alternating sequence. The three dimensional system comprises a pair of three-dimensional viewing glasses having a pair of lenses made of a liquid crystal material through which the right-eye subimage and the left-eye subimage are viewed by regulating the on/off states of the lenses; a pulse generator for generating a driving pulse adapted to activate the liquid crystal material; and a mixing circuit for multiplexing the switching pulse and the driving pulse to produce an on/off driving signal divided into a first and a second driving signals that are 180 degrees out of phase with each other wherein each of the first and the second driving signals is used to regulate the on/off states of the lenses.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
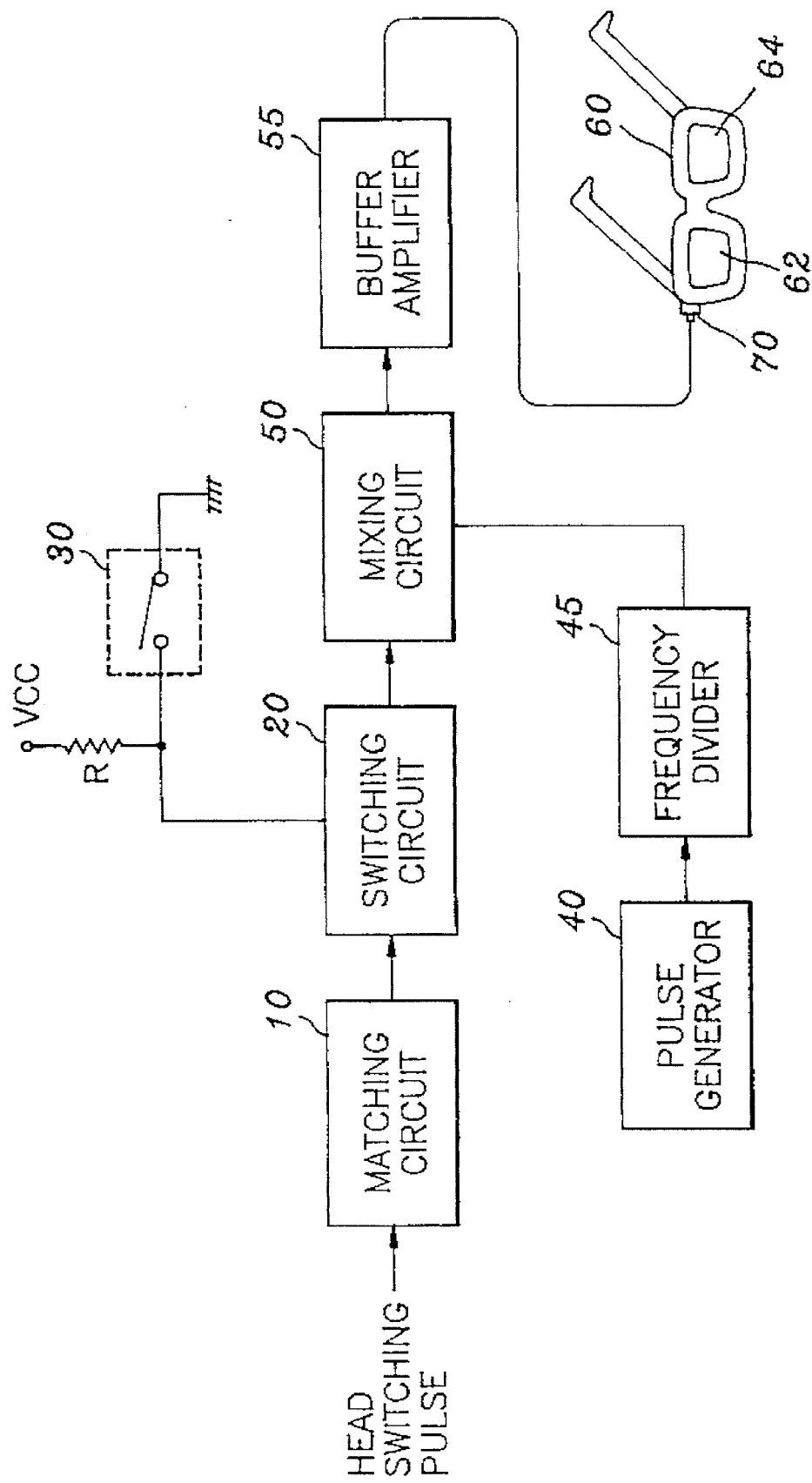
FIG. 1 represents a block diagram showing a three dimensional viewing system for use with a VCR in accordance with the present invention.

Referring to FIG. 1, there is shown a three dimensional viewing system having a pair of three dimensional viewing glasses 60 for use with a VCR(not shown) for the three dimensional viewing of a video image reproduced by the VCR. The reproduced video image utilized in the present invention is derived from a video source or video tape which provides a sequence of video frames, each of which is divided into two video fields corresponding to two different subimages of an object that are recorded from a first and a second directions, respectively, as the observer's two eyes would see the object from the first and the second directions. When the sequence of video frames is reproduced by the VCR, one of the two fields is viewed as a right-eye appropriate subimage and the other is viewed as a left-eye appropriate subimage through the three dimensional viewing glasses 60.

The pair of three dimensional viewing glasses 60 includes a right lens 62 to view the right-eye appropriate subimage and a left lens 64 to view the left-eye appropriate subimage. As partially shown in FIG. 3, each of the lenses 62 and 64 is formed with a liquid crystal material 66 sandwiched between a pair of transparent electrodes 68 and 69, one 69 of them being grounded and the other 68 receiving an on/off driving signal. Representative liquid crystal materials that may be employed in the present invention include a twisted nematic type liquid crystal and any other materials used in the art (see U.S. Pat. No. 4,907,860 which is incorporated herein by reference). When the on/off driving signal is applied to each of the transparent electrodes 68, the right and the left lenses 62 and 64 become alternately clear and cloudy so that the viewer is able to see the right-eye and the left-eye appropriate subimages in an alternating sequence.

Figure 4:
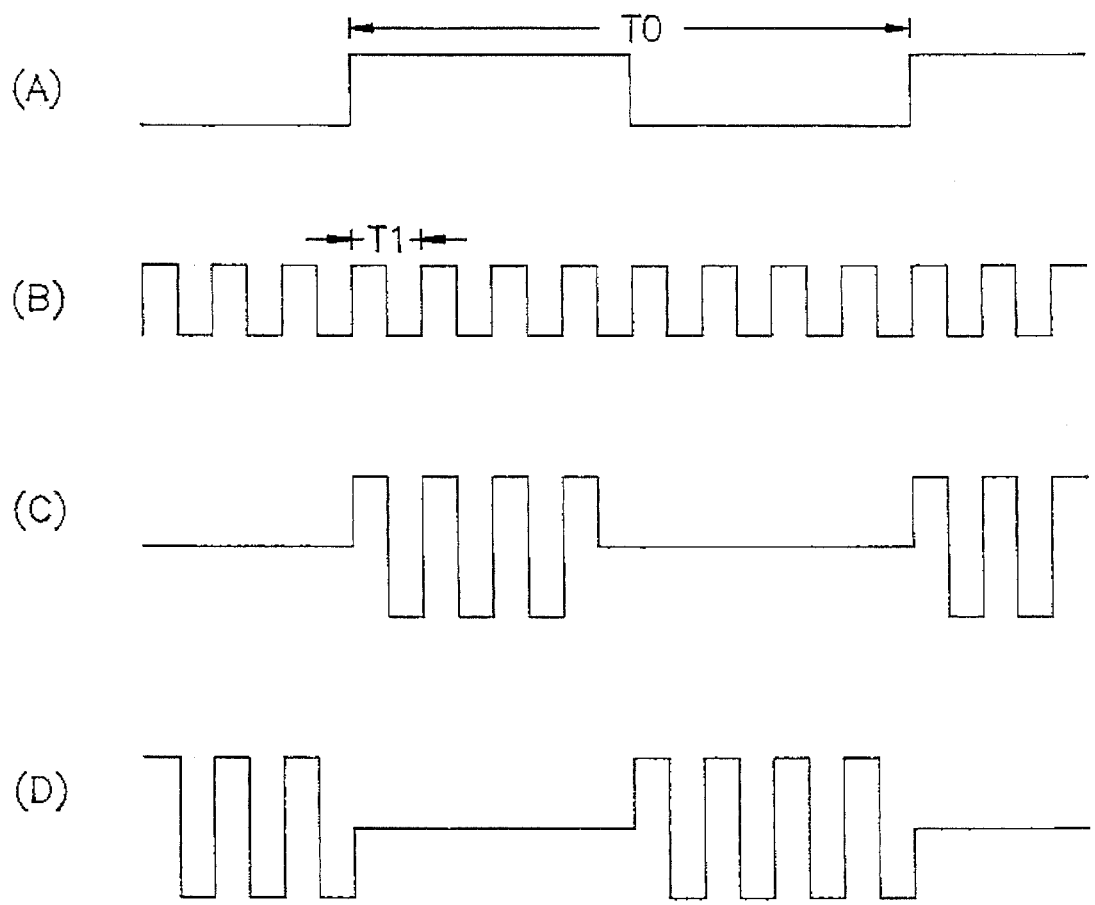
FIG. 4 shows waveforms generated from the three dimensional system as shown in FIG. 1.

On the other hand, as is well known in the art, the VCR is provided with a mechanism for generating a synchronizing pulse having a period of T0 as shown in FIG. 4A, called a head switching pulse when the reproduction operation is performed by the VCR. The head switching pulse occurs at each one-half revolution of a two-head assembly whereby each one of the two field images is switched and retrieved from the video tape track. The head switching pulse is in the form of a 30 Hz square wave (in case of NTSC standard format) or a 25 Hz square wave (in case of PAL standard format) and has a voltage level ranging from 1.5 to 5 volts.

The head switching pulse is applied to a matching circuit 10 shown in FIG. 1. The matching circuit 10 regulates the voltage level of the head switching pulse to match the characteristic of the three dimensional viewing system. The output from the matching circuit 10 is shown in FIG. 4A, which is applied to an input of a mixing circuit 50 via a pulse switching circuit 20 which will be further explained hereinafter.

A pulse generator 40 generates a short pulse having a certain frequency; and a frequency divider 45 divides the pulse from the pulse generator 40 to provide a driving pulse having a period of T1 suitable to activate the liquid crystal material 66 in the three dimensional viewing glasses 60. The driving pulse, shown in FIG. 2B, is applied to another input of the mixing circuit 50.

The mixing circuit 50 multiplexes the head switching pulse and the driving pulse to produce an on/off driving signal divided into a first and a second driving signals that are 180 degrees out of phase with each other, as shown in FIGS. 4C and 4D, respectively. Each of the first and the second driving signals is amplified by a buffer amplifier 55 and then separately applied to the transparent electrodes 68 in the right and left lenses 62 and 64 of the three dimensional glasses 60 to regulate the on/off states of the lenses 62 and 64. When the right lens 62 is in the clear or "ON" state as triggered by, e.g., the first driving signal, the left lens 64 is in the cloudy or "OFF" state so that the right-eye subimage can be perceived by the observer's right eye. Similarly, when the left lens 64 is in the "ON" state by the second driving signal, the left-eye subimage is perceived by the observer's left eye, with the right lens kept in the "OFF" or cloudy state. Consequently, the alternating states of the lenses can be synchronized with the alternating occurrences of the right-eye and left-eye subimages by the first and the second driving signals derived from the head switching pulse. During the viewing of the two field images, however, there may occur a discrepancy in the alternating sequence between the occurrences of the right-eye and left-eye subimages and the on/off states of the lenses. In accordance with the present invention, such discrepancy or non-synchronization is rectified by using the right/left image conversion scheme comprising the pulse switching circuit 20 and a conversion switch 30 shown in FIG. 1 whereby the first and the second driving signals may be switched each other.

Figure 2:
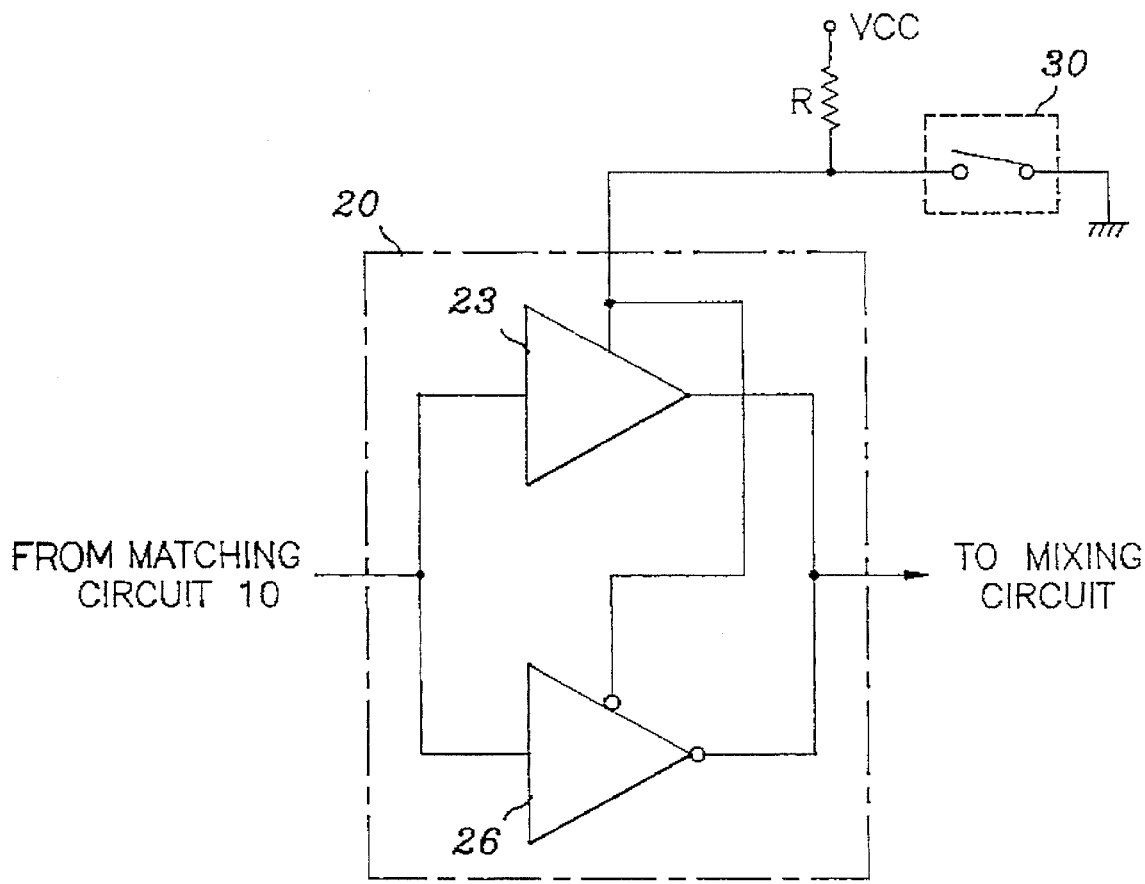
FIG. 2 describes the switching circuit shown in FIG. 1.

Referring now to FIG. 2, there is shown a detailed circuit diagram of the pulse switching circuit 20 which is connected between the matching circuit 10 and the mixing circuit 50. The pulse switching circuit 20 comprises a first tri-state gate 23 and a second tri-state inverter gate 26 which have their control inputs connected to the conversion switch 30, with their input terminals connected to the output of the matching circuit 10 and their output terminals connected to the input of the mixing circuit 50, respectively. When a logic "high" is applied to the control inputs of the first and the second gates 23 and 26 at the deactivation of the conversion switch 30, the first gate 23 behaves like a normal buffer with its output equal to the head switching pulse from the matching circuit 10, with the second inverter gate 26 being disabled. However, with a logic "low" applied to the control inputs at the activation of the conversion switch 30, the first gate 23 becomes disabled while the second inverter gate 26 produces at its output terminal the head switching pulse in an inverted version. Said inverted head switching pulse is then applied to the mixing circuit 50 whereby the on/off phase of the first and the second driving signals is reversed each other. Consequently, the first and the second reversed driving signals are applied to the right and the left lenses 62 and 64 of the three dimensional glasses 60, to thereby synchronize the viewing.

Figure 3:
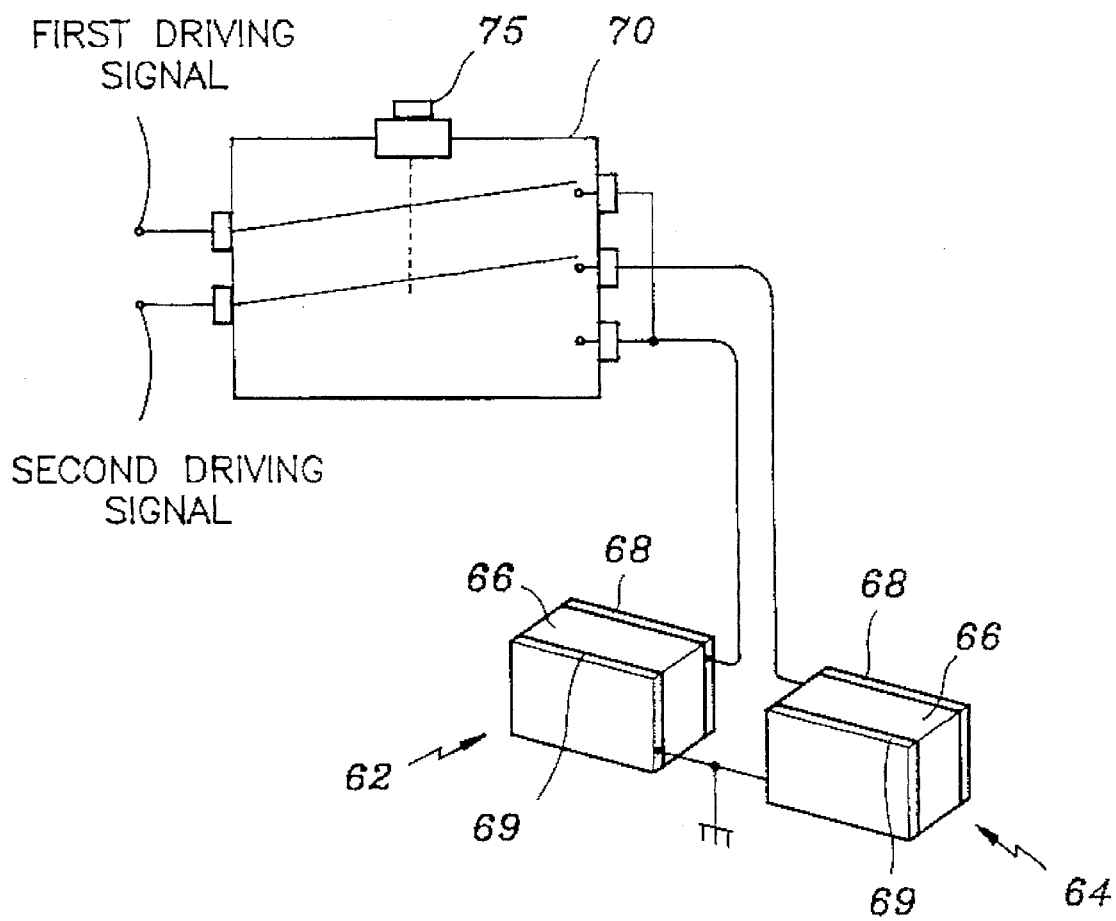
FIG. 3 illustrates another embodiment of the switching circuit incorporated in the three dimensional viewing glasses shown in FIG. 1.

Referring to FIG. 3 along with FIG. 1, there is shown another embodiment of the present invention wherein the pair of three dimensional viewing glasses 60 is equipped with the capability of selectively converting the first and the second driving signals. The three dimensional viewing glasses are provided with a similar driving signal conversion switch 70 to the image conversion scheme described above. The driving signal conversion switch 70 comprises a 2-input, 3-output two-stage slide switch of a conventional design which receives the first and the second driving signals from the buffer amplifier 55. When a slide button 75 mounted on the driving signal conversion switch 70 is pushed, the paths of the first and the second driving signals are changed with each other and applied to the left and right lenses 64 and 62, respectively. Therefore, the right-eye and the left-eye appropriate subimages can be viewed through the observer's right and the left eyes as desired.

While the present invention has been shown and described with reference to the particular embodiments, it will be apparent to those skilled in the art that many changes and modifications may be made without departing from the spirit and scope of the invention as defined in the appended claims.

What is claimed is:

1. A three dimensional viewing system for use with a video cassette recorder for the three-dimensional viewing of an image consisting of a right-eye and a left-eye subimages reproduced by the video cassette recorder, which comprises:

means in the video cassette recorder for generating a synchronizing pulse by which said subimages are reproduced in an alternating sequence, wherein the synchronizing pulse is a head switching pulse which is generated from the video cassette recorder to switch and retrieve each one of the right-eye and the left-eye subimages when a reproduction operation is performed by the video cassette recorder;

a pair of three-dimensional viewing glasses having a pair of lenses made of a liquid crystal material;

means for generating a driving pulse to activate the liquid crystal material;

means for deriving from the synchronizing pulse first and second synchronizing pulses that are 180 degrees out of phase with each other;

means for mixing the first and the second synchronizing pulses with the driving pulse to produce first and second driving signals, wherein the first and the second driving signals are employed to activate one of the lenses and deactivate the other lens in an alternating sequence in such a manner that the alternating sequence of said subimages is in synchronization with that of activating and deactivating the lenses; and means connected to said deriving means for converting the phases of the first and the second synchronizing pulses when the alternating sequence of said subimages is out of synchronization with that of activating and deactivating the lenses.

2. A three dimensional viewing system for use with a video cassette recorder for the three-dimensional viewing of an image consisting of a right-eye and a left-eye subimages reproduced by the video cassette recorder, which comprises:

means in the video cassette recorder for generating a synchronizing pulse by which said subimages are reproduced in an alternating sequence, wherein the synchronizing pulse is a head switching pulse which is generated from the video cassette recorder to switch and retrieve each one of the right-eye and the left-eye subimages when a reproduction operation is performed by the video cassette recorder;

a pair of three-dimensional viewing glasses having a pair of lenses made of a liquid crystal material;

means for generating a driving pulse to activate the liquid crystal material;

means for deriving from the synchronizing pulse first and second synchronizing pulses that are 180 degrees out of phase with each other;

means for mixing the first and the second synchronizing pulses with the driving pulse to produce first and second driving signals, wherein the first and the second driving signals are employed to activate one of the lenses and deactivate the other lens in an alternating sequence in such a manner that the alternating sequence of said subimages is in synchronization with that of activating and deactivating the lenses; and means connected between the mixing means and the three-dimensional viewing glasses for converting the paths of the first and the second driving signals to the lenses when the alternating sequence of said subimages is out of synchronization with that of activating and deactivating the lenses.

* * * * *